United States Patent
Lee

[11] Patent Number: 5,978,024
[45] Date of Patent: *Nov. 2, 1999

[54] AUTO VARIABLE ANTI-BLOOMING BIAS CONTROL CIRCUIT AND METHOD

[75] Inventor: Sung Min Lee, Seoul, Rep. of Korea

[73] Assignee: LG Semicon Co., Ltd., Chungcheongbuk-do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/588,533

[22] Filed: Jan. 18, 1996

Related U.S. Application Data

[63] Continuation of application No. 08/228,037, Apr. 15, 1994, abandoned.

[51] Int. Cl.[6] .................................................. H04N 5/335
[52] U.S. Cl. .......................... 348/299; 348/314; 348/366
[58] Field of Search .................................... 348/230, 241, 348/296, 298, 299, 327, 314, 366; H04N 5/335

[56] References Cited

U.S. PATENT DOCUMENTS

| | | | |
|---|---|---|---|
| 3,539,826 | 11/1970 | Crouse ..................................... | 327/363 |
| 3,735,257 | 5/1973 | Roesner ................................ | 324/76.66 |
| 4,297,851 | 11/1981 | Paddock et al. ........................... | 62/126 |
| 4,373,167 | 2/1983 | Yamada ..................................... | 257/230 |
| 4,380,028 | 4/1983 | Pepin et al. .............................. | 348/327 |
| 4,471,324 | 9/1984 | Welland ................................... | 330/282 |
| 4,748,486 | 5/1988 | Miyatake ................................... | 257/444 |
| 4,926,247 | 5/1990 | Nagasaki et al. ........................ | 348/262 |
| 5,057,926 | 10/1991 | Watanabe ................................ | 348/314 |
| 5,065,248 | 11/1991 | Homma .................................... | 348/229 |
| 5,233,428 | 8/1993 | Alford et al. ............................ | 348/230 |
| 5,276,520 | 1/1994 | Hawkins et al. ......................... | 348/299 |
| 5,291,044 | 3/1994 | Gaboury et al. ......................... | 257/230 |
| 5,614,740 | 3/1997 | Gardner et al. .......................... | 257/223 |

OTHER PUBLICATIONS

Microelectronics—Jacob Millman—McGraw Hill Book Company, 1979, pp. 535–542.
Chart from the Sony CCD Data Book (1992).

*Primary Examiner*—Wendy Garber
*Assistant Examiner*—Andrew B. Christensen
*Attorney, Agent, or Firm*—Morgan, Lewis & Bockius LLP

[57] ABSTRACT

This invention relates to auto variable anti-blooming bias circuits which can automatically vary the anti-blooming bias of the CCD image sensors according to the intensity of light incident thereon. The circuits comprise a DC voltage generation part for receiving signals fed-back from the output terminal of the CCD image sensor and generating DC voltage by averaging the applied signals, an input voltage generation part for receiving DC voltage transmitted from the DC voltage generation part and generating variable input voltage according to the received DC voltage, and an anti-blooming bias generation part for receiving the variable input voltage transmitted from the input voltage generation part and reference voltage and transmitting to the input, terminal of the CCD image sensor as an anti-blooming bias after comparing the two signals.

28 Claims, 6 Drawing Sheets

AUTO VARIABLE ANTI-BLOOMING BIAS CONTROL CIRCUIT AND METHOD

This application is a continuation of application Ser. No. 08/228,037, filed Apr. 15, 1994, now abandoned.

FIELD OF THE INVENTION

This invention relates to CCD (Charge Coupled Device) image sensors, more particularly to auto variable anti-blooming bias circuits which can automatically vary the anti-blooming bias of the CCD image sensors and according to the intensity of light incident thereon.

BACKGROUND OF THE INVENTION

Shown in FIG. 1 is a section of a conventional CCD image sensor.

A conventional CCD sensor includes a n-type substrate 61, a p-type well 62 formed on the n-type substrate 61, a n+-type photo diode 63 formed on the p-type well 62 for generating signal charge, a n+-type VCCD (Vertical Charge Coupled Device) area 64 formed on the p-type well 62 spaced a certain distance from the photo diode 63 and transmitting the signal charge transmitted from the photo diode 63 to a HCCD (Horizontal Charge Coupled Device) area (not shown), a p++ layer 65 formed on the surface of the photo diode 63 for forming a electric potential barrier, a transfer gate 66 for transmitting the signal charge generated in the photo diode 63 to the VCCD area 64, a HCCD area transmitting the signal charge from the VCCD area 64 to a power amplifier(not shown), a power amplifier(not shown) for transmitting an image signal Vout after receiving the signal charge transmitted from the HCCD area, a polygate 67 for transmitting the signal charge from the VCCD area 64 to the HCCD area(not shown), an insulation layer 68 formed on the substrate 61 between the polygate 67 and the transfer gate 66 for insulating the polygate 67 from the transfer gate 66, and a p++-type channel stop area 69 for insulating between cells by forming high electric potential barriers.

In a CCD image sensor having a construction as shown in FIG. 1, the photo diode 63, on receiving light, generates a signal charge corresponding to the intensity of the light, which signal charge is transmitted to the VCCD area 64 in response to the signal applied to the transfer gate 66. This signal charge transmitted to the VCCD area 64 is transmitted to the HCCD area in response to the signal applied to the polygate 67, which is transmitted to the power amplifier in response to the signal applied to the HCCD area and, finally, output as a video signal.

However, in the event that the photo diode 63 receives a light having too high intensity, the photo diode generates excessive signal charge.

The image signal output of this excessive signal charge exhibits the blooming phenomena.

As for the methods for eliminating such excessive signal charge, there are methods in which the excessive signal charge is made to escape in a direction opposite to the VCCD area 64 through an overflow drain region formed between the channel stop area 69 and the photo diode 63, or toward the substrate by applying anti-blooming bias to the substrate 61.

In general, the blooming is controlled by applying bias to a substrate of integrated solid state image elements, which anti-blooming bias is of voltage of direct current, generally above 5 V and below 18 V.

However, for controlling a photo accumulation period of time, electrical shutter pulses having a magnitude above 20 V can be applied thereto.

Shown in FIG. 2 is a conventional manual variable anti-blooming DC bias circuit.

The conventional manual variable anti-blooming DC bias circuit has resistances R11 and R12 and a variable resistance VR11, wherein the variable resistance VR11 is adjusted to apply desired anti-blooming bias voltage to the CCD image sensor 60; the 24 V is divided by the resistances R11 and R12 and the variable resistance VR11 adjusted by a user, which is applied to the substrate SUB of the CCD image sensor 10.

Therefore, the user can prevent blooming due to the excessive light incident on the CCD image sensor by adjusting the variable resistance VR11 image sensor so as to apply appropriate anti-blooming bias to the CCD image sensor.

Referring to FIG. 2, as the 24 V power is fed through a circuitry connection, it can be more or less unstable, but with a circuit as shown in FIG. 3, a stable power can be fed to a CCD image sensor.

Shown in FIG. 3 is an example of application of the manual variable anti-blooming bias circuit shown in FIG. 2.

In the circuit shown in FIG. 3, when the stable power(15 V) is applied to the manual variable anti-blooming bias circuit, a constant voltage divided by resistances R13 and R14 is applied to a transistor Q11 at a base terminal thereon.

And the 24 V transmitted from a vertical operation part 40 is adjusted by the variable resistance VR11 and applied therefrom to a transistor Q12 at a base terminal thereon.

According to operation of the transistor Q12, a desired anti-blooming bias can be applied to an input terminal SUB of the CCD image sensor 60 through a transistor Q13.

In this time, in case the 24 V power is unstable, a permanent direct current anti-blooming bias is fed to the CCD image sensor 60 at the input terminal SUB thereon due to a continuous induction of a current flowing in the transistor by a continuous current flowing in the transistor Q11.

Accordingly, the CCD image sensor 60 transmits anti-blooming bias, an output voltage Vout based on which is transmitted to a signal processor 80 through terminal OUT and, consequently, the signal processor 80, processing the signal transmitted from the CCD image sensor 60, transmits video signals.

On the other hand, in case pulses above 15 V are transmitted from one output terminal Vsub of the vertical driving part 40, shutter pulses of 15 V DC are applied to the input terminal SUB of the CCD image sensor 60 under a condition that the 15 V voltage is set up by the diode 11, irrespective of the anti-blooming bias transmitted from a anti-blooming bias circuit 20.

Shown in FIG. 4 is potential distributions based on anti-blooming bias VOFD in accordance with the CCD image sensor of FIG. 1.

The higher the anti-blooming bias VOFD, the lower a electric potential barrier toward the substrate 61 making a signal saturation quantity ie., the quantity of signal charge which can be accumulated in the photo diode 63 less.

Shown in FIG. 5 is a graph showing relation between anti-blooming bias VOFD and smear noise in accordance with the CCD image sensor shown in FIG. 1, wherein it shows that, when anti-blooming bias VOFD becomes higher, ie., the signal saturation quantity becomes less, the smear noise increases.

Shown in FIG. 6 are graphs showing relation between the intensity of light according to anti-blooming bias and the output voltage of the CCD image sensor of FIG. 1, wherein it shows that when anti-blooming bias VOFD becomes higher, the electric potential toward the substrate is formed lower, accumulating less signal saturation quantity, so that, when little quantity of light is incident, desired output voltage Vout can not be obtained.

The lower the anti-blooming bias VOFD become, the higher the electric potential barrier toward the substrate is formed making the signal saturation quantity greater resulting to obtain the desired output voltage Vout even with little quantity of light.

Referring to FIGS. 4 to 6, in case a user adjusts the variable resistance VR11 of FIG. 2 setting the anti-blooming bias VOFD at a higher value of VOFD1 in advance, even though an excessive signal charge would be generated in the photo diode 63 when excessive light is incident thereto, it is possible to prevent blooming because the sufficient excessive signal charge is made to escape to the substrate 61.

However, it raises a problem of making the smear noise increase due to the high anti-blooming bias VOFD. on the other hand, when little quantity of light is incident thereon, even though desired quantity of signal charge be generated, due to low electric potential barrier formed toward the substrate by the high anti-blooming bias, accumulating little quantity of charge saturation, the signal charge is made to escape to the substrate creating a problem of obtaining no desired video signal.

In the meantime, in case the variable resistance VR11 of FIG. 2 is set the anti-blooming bias VOFD at a lower value of VOFD3 in advance, the anti-blooming bias VOFD becomes lower making the smear noise decrease.

However, because the anti-blooming bias is low, electric potential barrier is formed high preventing the excessive signal charge from escaping to the substrate 61, but making it transmitted to the VCCD area 64. Consequently, it raises a problem of developing blooming.

SUMMARY OF THE INVENTION

The object of this invention for solving the problems developed by setting anti-blooming bias in advance as the foregoing description in conventional way, is providing an auto variable anti-blooming bias circuit which can improve photo sensitivity in weak light and prevent blooming in intense light by varying anti-blooming bias automatically according to the intensity of light.

These and other objects and features of this invention can be achieved by providing a CCD image sensor having an input terminal and an output terminal, including a DC voltage generation part for receiving signals fed-back from the output terminal of the CCD image sensor and generating DC voltage by averaging the signals transmitted from the CCD image sensor, an input voltage generation part for receiving DC voltage transmitted from the DC voltage generation part and generating variable input voltage according to the received DC voltage, and an anti-blooming bias generation part for receiving the variable input voltage transmitted from the input voltage generation part and reference voltage and transmitting to the input terminal of the CCD image sensor as an anti-blooming bias after comparing the two signals transmitted thereto.

DETAILED DESCRIPTION OF THE INVENTION

An embodiment of this invention is to be explained in detail hereinafter, referring the attached drawings.

Figure 1:
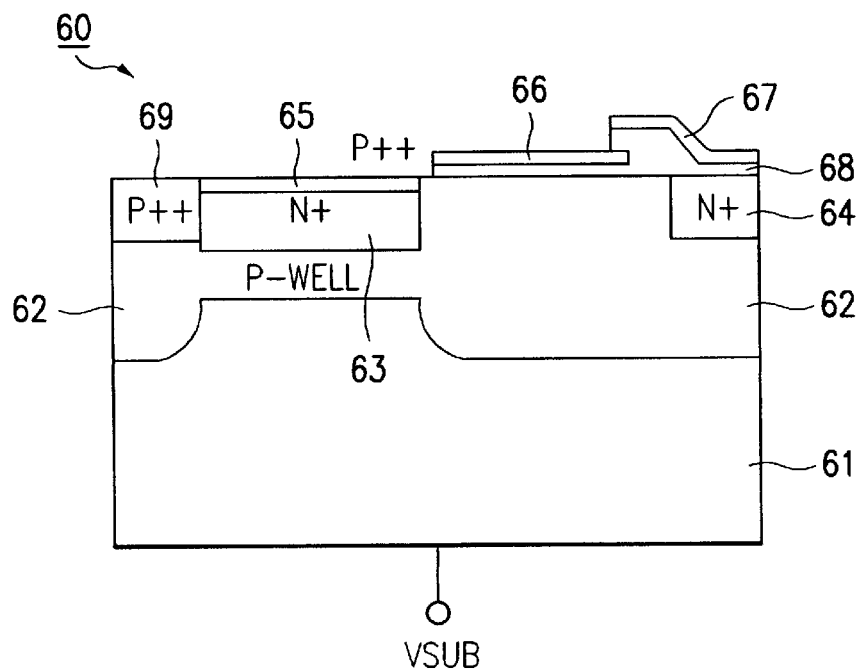
FIG. 1 is a section of a conventional CCD image sensor.
Figure 2:
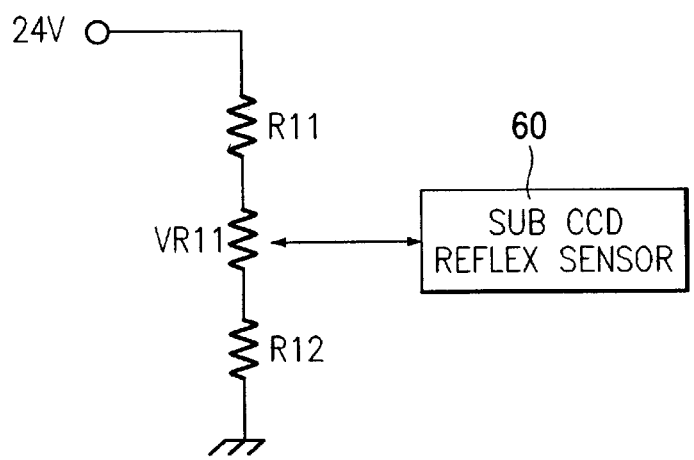
FIG. 2 shows a conventional manual variable anti-blooming bias circuit.
Figure 3:
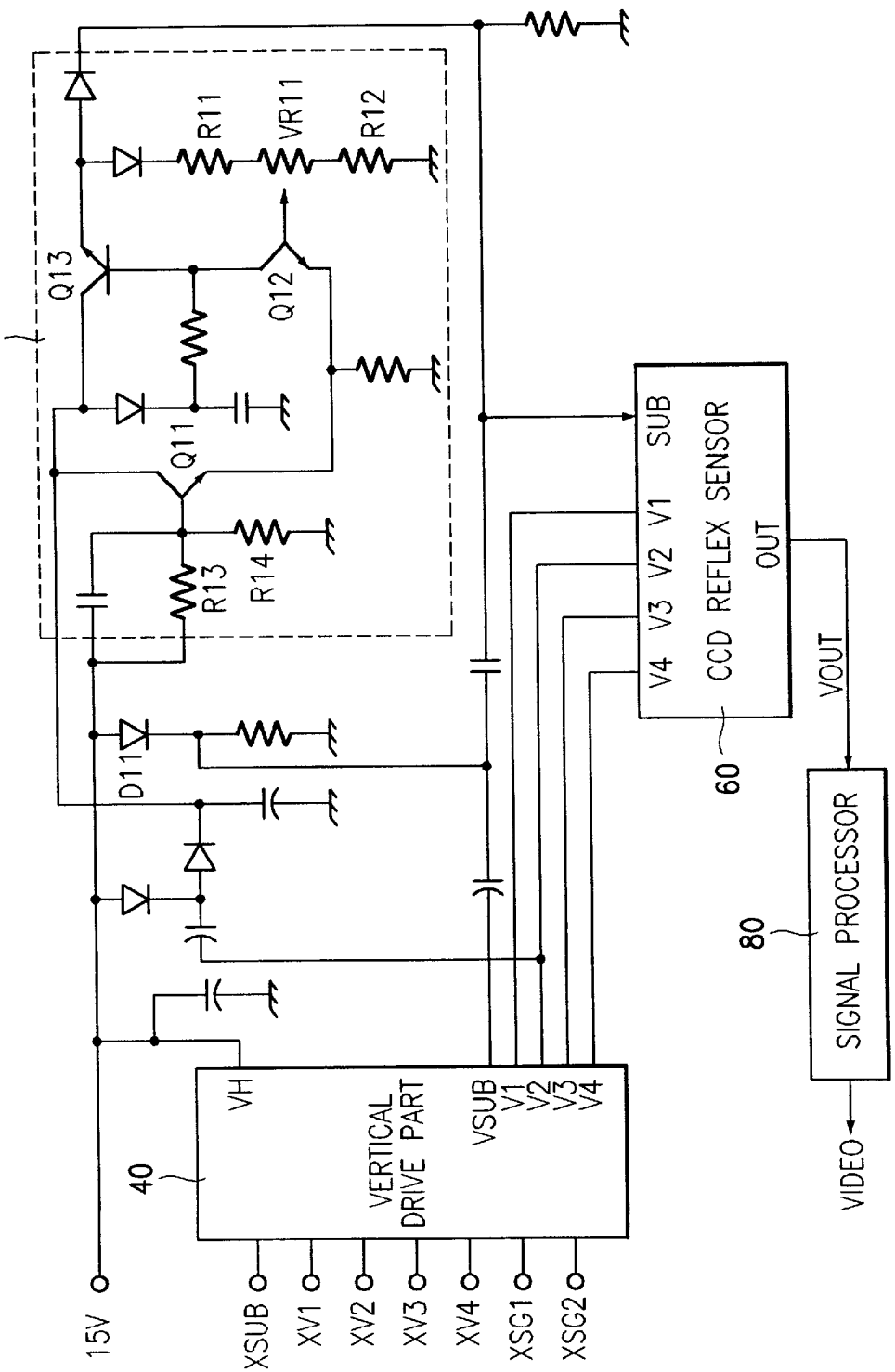
FIG. 3 shows an example of application of the manual variable anti-blooming bias circuit of FIG. 2.
Figure 4:
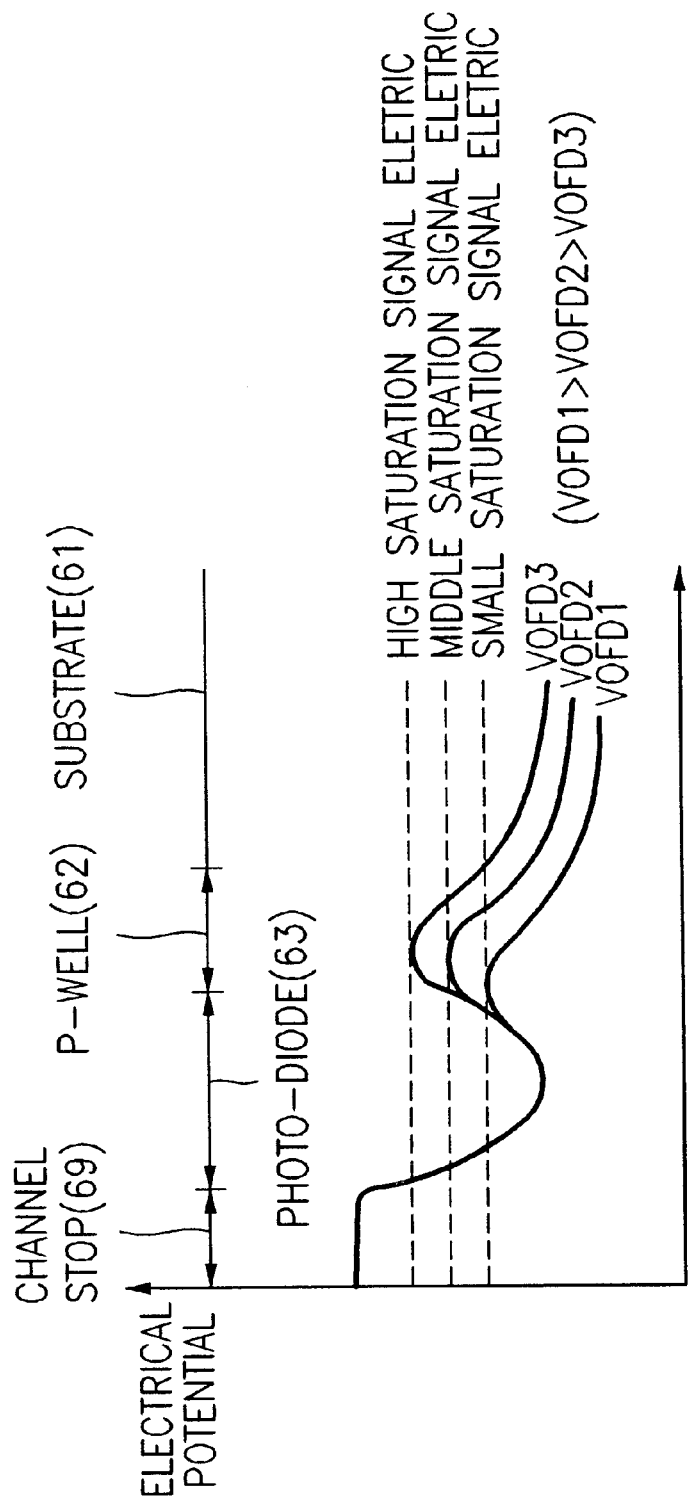
FIG. 4 shows electric potential distributions according to the anti-blooming bias VOFD in the CCD image sensor of FIG. 1.
Figure 5:
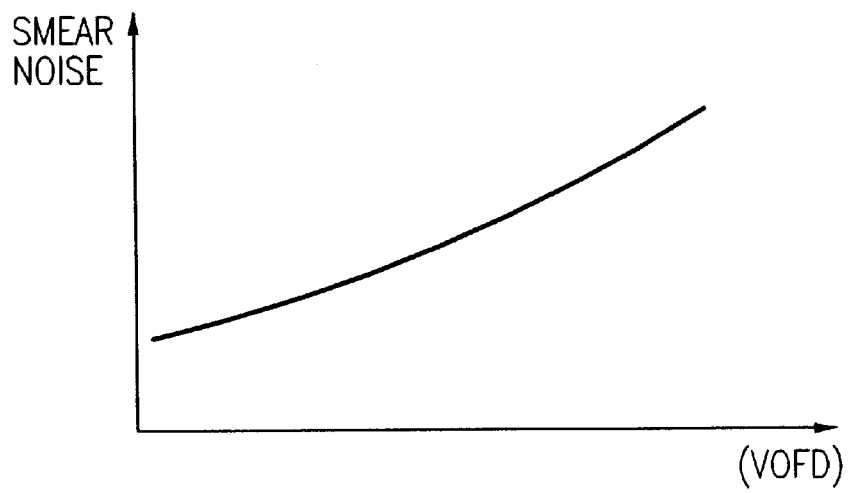
FIG. 5 is a graph showing the relation between the anti-blooming bias VOFD and smear noise in the CCD image sensor.
Figure 6:
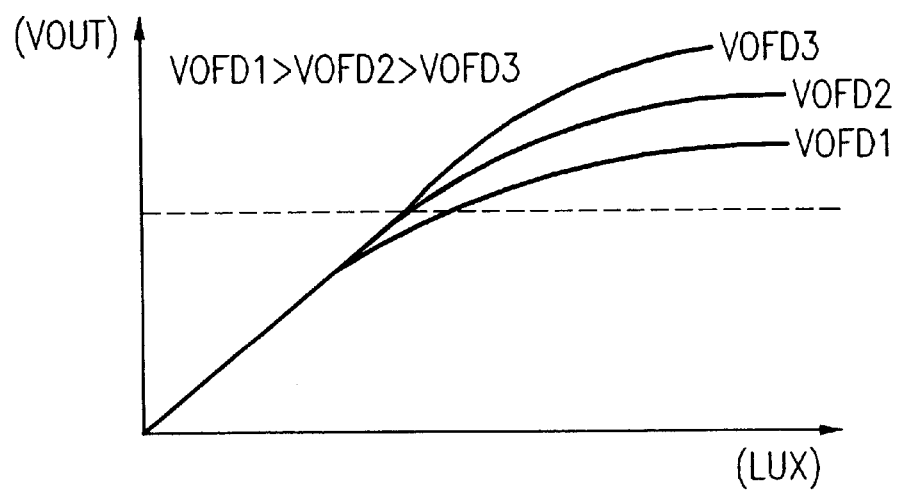
FIG. 6 is a graph showing the relation between the intensity of light and the output voltage of the CCD image sensor according to the anti-blooming bias VOFD.
Figure 7:
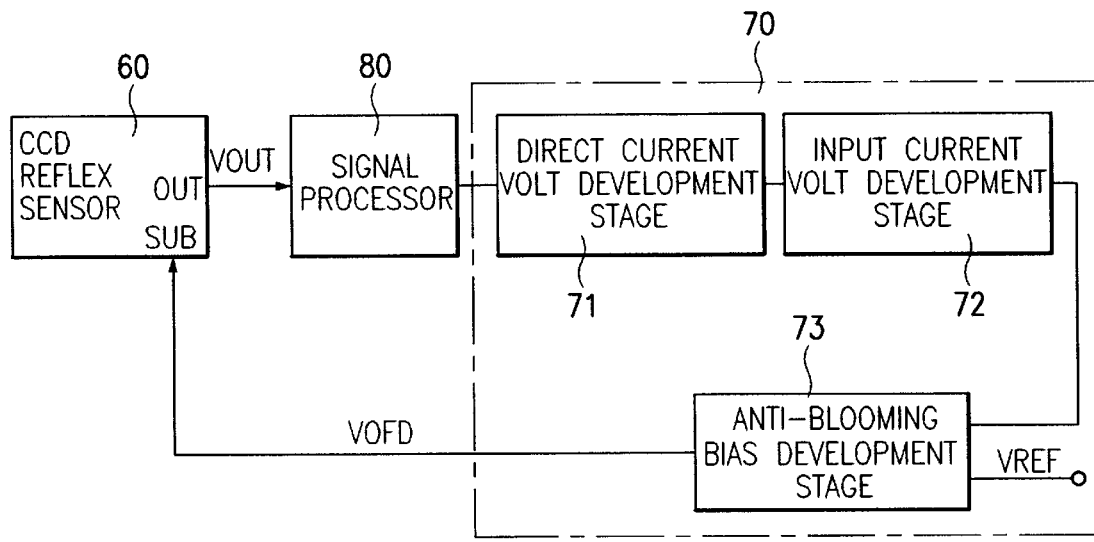
FIG. 7 is a block diagram of an auto variable anti-blooming bias circuit in accordance with this invention.

FIG. 7 is a block diagram of an auto variable anti-blooming bias circuit in accordance with this invention.

Referring to FIG. 7, an auto variable anti-blooming bias circuit 70 is a circuit for varying anti-blooming bias automatically by comparing signals Vout fed back from a CCD image sensor 60 to a reference voltage Vref, including a DC voltage generation part 71 for generating DC voltage by integrating intermediate output signals VIRIS of a signal processor 80 for processing output signals Vout from the CCD image sensor 60, an input voltage generation part 72 for generating and transmitting variable input voltage according to the DC voltage transmitted from the DC voltage generation part 71, and an anti-blooming bias generation part 73 for receiving the output of the input voltage generation part 72 and the reference voltage as applied signals, varying anti-blooming bias according to the variable input voltage transmitted from the input voltage generation part 72, and transmitting therefrom to a receiving terminal SUB of the CCD image sensor 60.

Figure 8:
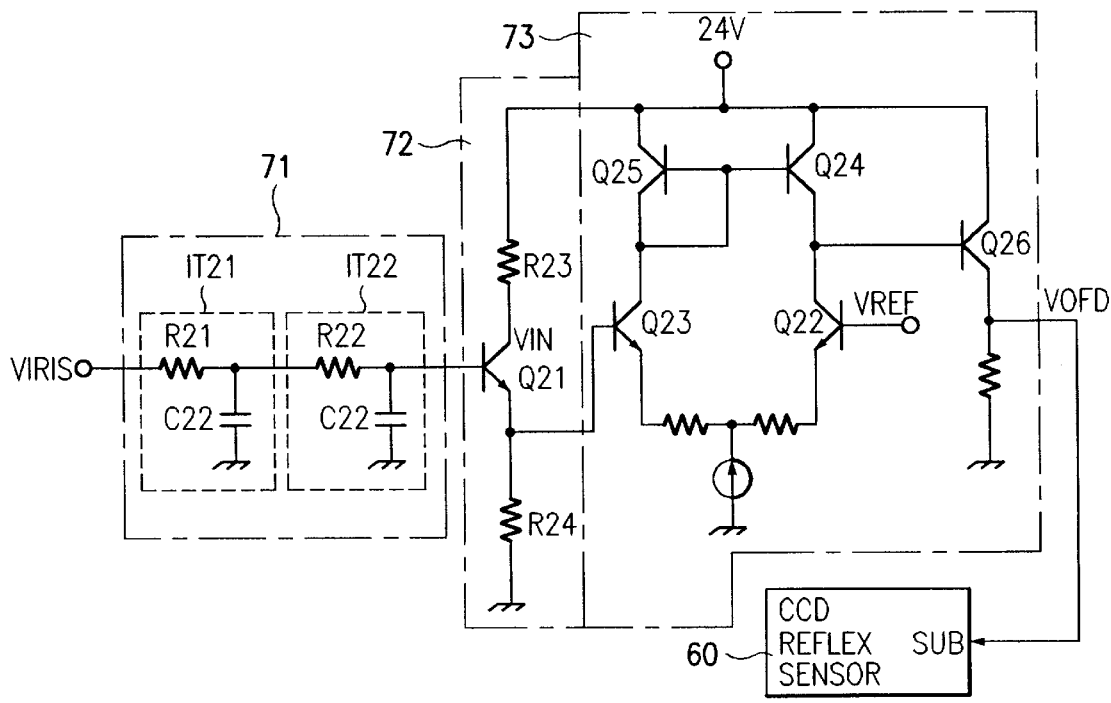
FIG. 8 is a detailed drawing of the auto variable anti-blooming bias circuit of FIG. 7.

FIG. 8 is a detailed drawing of the auto variable anti-blooming bias circuit of FIG. 7.

Referring to FIG. 8, the DC voltage generation part 71 having two integrator (low pass filter) IT21 and IT22, obtains an average value of the signals VIRIS transmitted from the signal processor 80, and transmits voltage converted into DC.

Each integrator IT21 and IT22 has a resistance and a condenser R21 and C21, and R22 and C22.

The input voltage generation part 72 serves to apply the input voltage varying depending on the DC voltage transmitted from the DC voltage generation part 71 to the anti-blooming bias generation part 73, and includes a transistor having a base terminal the output signal of the DC voltage generation part 71 is applied thereto, and resistances R23 and R24 each connected to a collector and an emitter of the transistor Q21 to divide the source voltage 24 to transmit variable input voltage Vin.

The anti-blooming bias generation part 73 serves to generate and transmit the anti-blooming bias VOFD varying depending on the difference between the variable input voltage Vin and the reference voltage Vref, and includes differential amplification transistors Q22 and Q23 each having a base terminal the variable input voltage Vin from the input voltage generation part 72 and the reference voltage Vref are transmitted thereto, respectively, current driving transistors Q24 and Q25 connected to a collector of the transistors Q22 and Q23, respectively, and a transistor Q26 operated by the differentially amplified signals applied to the transistors Q22 and Q23 at each of base terminals thereon.

The operation of an auto variable anti-blooming bias circuit in accordance with this invention as per the foregoing description is to be explained hereinafter.

The output signal Vout of the CCD image sensor 60 is applied to the signal processor 80, and the intermediate output signal VIRIS of the signal processor 80 is applied to the DC voltage generation part 71 of the auto variable anti-blooming circuit 70.

The DC voltage generation part 71 integrates the intermediate output signals VIRIS of the signal processor 80 through the two integrators IT21 and IT22 each having the resistor and the condenser R21 and C21, and R22 and C22 to obtain average value.

The DC voltage obtained in the DC voltage generation part 71 is transmitted to the base terminal of the transistor Q21 of the input voltage generation part 72.

The transistor Q21, operated by the output signal of the DC voltage generation part 71 applied on the base terminal, in case the intermediate output signal VIRIS of the signal processor 80 is great due to little quantity of light incident to the CCD image sensor 60, makes low anti-blooming bias applied on the CCD image sensor.

Accordingly, the intermediate output signal VIRIS of the signal processor 80 become high making the output signal of the DC voltage generation part 71 high enough to operate the transistor Q21.

The source voltage 24 V is divided by the resistances R23 and R24, which is applied to the base terminal of the transistor Q23 of the anti-blooming bias generation part 73 as a variable input signal Vin.

The anti-blooming bias generation part 73, being applied with low variable input signal Vin having little difference with the reference voltage Vref, applies low anti-blooming bias VOFD to the CCD image sensor 60 at the input terminal SUB through the transistor Q26.

In this time, the reference voltage is set by a user in advance using a variable resistance.

Therefore, in case little quantity of light is to incident to the CCD image sensor 60, the output signal Vout of the CCD image sensor is fed-back through the signal processor 80, and the low anti-blooming bias VOFD obtained automatically according to the output signal of the CCD image sensor 60 is transmitted to the CCD image sensor 60.

On the other hand, in case an excessive light is incident to the CCD image sensor 60 forming a low intermediate output signal VIRIS of the signal processor 80, high anti-blooming bias is made to be applied to the CCD image sensor 60.

In this case, because the intermediate output signal VIRIS of the signal processor 80 is low, the output signal of the DC voltage generation part 71 becomes low making operation of the transistor Q23 impossible.

Consequently, the source voltage 24 V is applied to the transistor Q23 of the anti-blooming bias generation part 73 at the base terminal through the resistance as a variable input signal Vin.

The anti-blooming bias generation part 73 is applied with high variable input signal Vin having great difference with the reference voltage Vref, according to which, a high anti-blooming bias VOFD is applied to the CCD image sensor 60 at the input terminal SUB through the transistor Q26.

Therefore, in case an excessive light is incident to the CCD image sensor 60, the output signal Vout of the CCD image sensor 60 is fed-back through the signal processor 80.

In the meantime, also in case middle or slightly bright light is incident to, an appropriate anti-blooming bias VOFD can be set automatically in response to the light.

Figure 9:
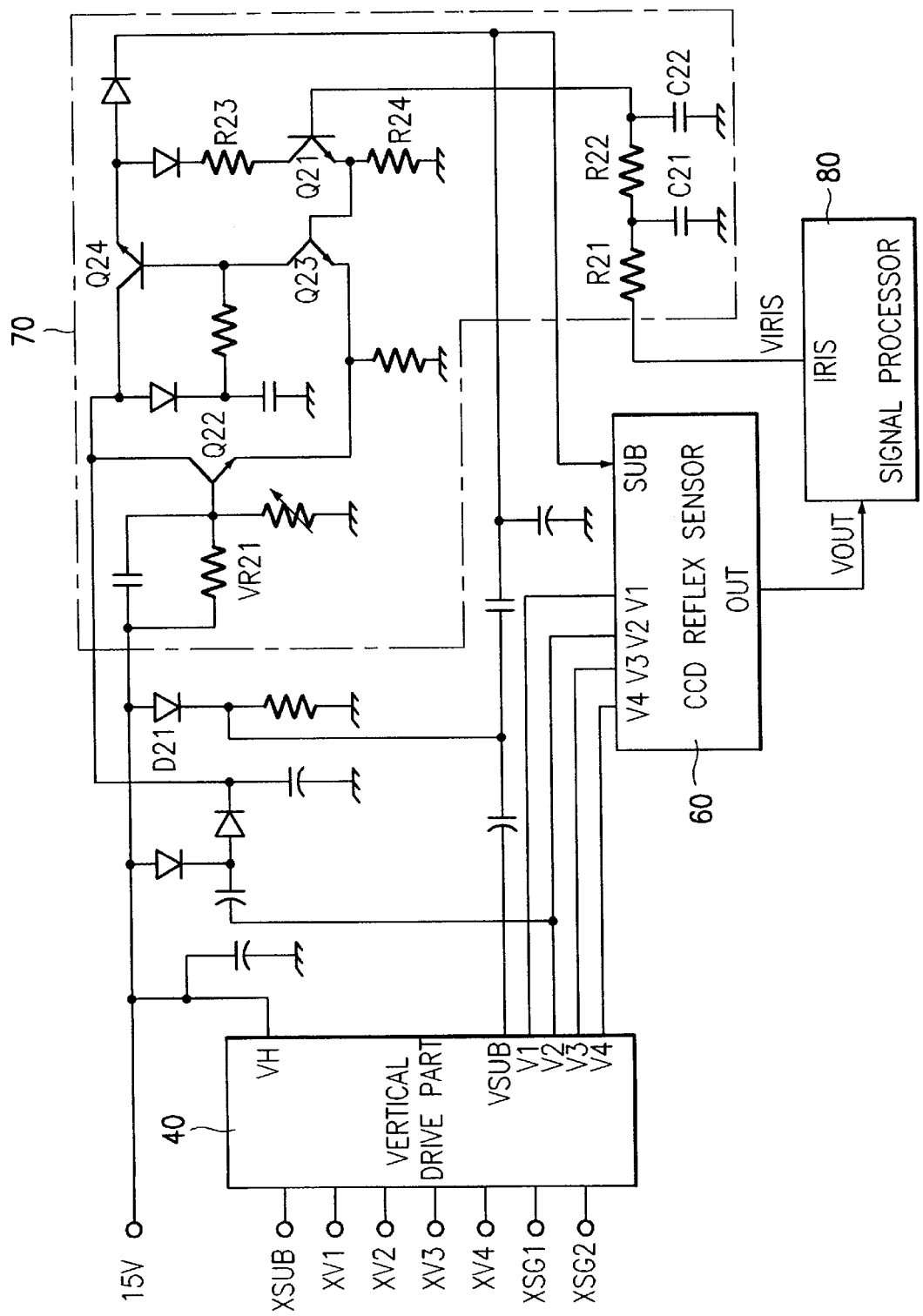
FIG. 9 shows an example of application of the auto variable anti-blooming bias circuit of FIG. 7.

FIG. 9 shows an example of application of the auto variable anti-blooming bias circuit of FIG. 7.

When the auto variable auto-blooming bias circuit 70 is applied with the source voltage 15 V, a user can adjust the variable resistance VR21 to set the reference voltage Vref.

In this time, when the output signal VIRIS of the signal processor 80 the output signal Vout of the CCD image sensor 60 is transmitted thereto as an input signal, is applied to the auto variable anti-blooming bias circuit 70 of this invention, the auto variable anti-blooming bias circuit 70 of this invention transmits an appropriate anti-blooming bias VOFD to the CCD image sensor at the input terminal SUB in response to the output signal VIRIS of the signal processor 80.

Accordingly, the CCD image sensor 60 can generate desired output signal Vout in response to an appropriate anti-blooming bias VOFD transmitted from the auto variable anti-blooming bias circuit 70.

Meantime, in case pulses above 15 V is transmitted from one output terminal Vsub of the vertical driving part 40, shutter pulses of DC 15 V are applied to the CCD image sensor 60 at the input terminal SUB under the condition that 15 V voltage be set up by the diode D21, irrespective of the anti-blooming bias transmitted from the auto variable anti-blooming bias circuit 70 of this invention.

In accordance with an auto variable anti-blooming bias circuit of this invention as explained in the foregoing description, it is possible to reduce smear than before improving the visibility of images by feeding back the signals transmitted from a CCD image sensor and adjusting the anti-blooming bias automatically according to the fed-back signals, making the anti-blooming bias decreased in weak light improving photo sensitivity, increased in intense light improving blooming, and setting an appropriate anti-blooming bias in middle or slightly bright light.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. An auto variable anti-blooming bias circuit for a charge coupled device (CCD) image sensor having an input terminal and an output terminal on a semiconductor substrate, comprising:

a signal processor for receiving a CCD output detected image voltage signal from the output terminal of the CCD image sensor;

DC voltage generation means for receiving a processed signal feedback from the signal processor and for generating a DC voltage by averaging the processed signal;

input voltage generation means for receiving the DC voltage from the DC voltage generation means and for generating an input voltage according to the received DC voltage; and anti-blooming bias generation means for receiving the input voltage transmitted from the input voltage generation means and a reference voltage and for transmitting to the input terminal of the CCD image sensor an adjusted voltage as an anti-blooming bias after comparing the input voltage generated by the input voltage generation means and the reference voltage, wherein the anti-blooming bias generation means automatically increases the anti-blooming bias by decreasing a difference between the input voltage and the reference voltage when excessive light is incident to the CCD image sensor, and automatically decreases the anti-blooming bias by increasing the difference between the input voltage and the reference voltage when insufficient light is incident to the CCD image sensor, and wherein the anti-blooming bias generation means includes transistors receiving the reference voltage and the input voltage transmitted from the input voltage generation means, respectively at each base terminal thereon as applied signals thereto, current operation transistors connected to the transistors, respectively at a collector thereon, and a transistor for receiving signals differentially amplified according to differences of the two applied signals of the transistors at a base terminal thereon as an applied signal, and transmitting the anti-blooming bias to the input terminal of the CCD image sensor in accordance with the differentially amplified signals.

2. The auto variable anti-blooming bias circuit as claimed in claim 1, wherein the DC voltage generation means includes first and second integrators each including a resistor and a capacitor.

3. The auto variable anti-blooming bias circuit as claimed in claim 1, wherein the input voltage generation means includes a transistor having a base terminal for receiving the DC voltage from the DC voltage generation means as an input signal, the transistor being operated by the DC voltage, and first and second resistors connected to a collector and an emitter, respectively, of the transistor, and wherein the input voltage generation means generates the input voltage according to the operation of the transistor.

4. An auto variable anti-blooming bias circuit for a charge coupled device (CCD) image sensor having an input terminal and an output terminal on a semiconductor substrate, comprising:

signal processing means for processing output signals from the output terminal of the CCD image sensor;

DC voltage means for generating a DC voltage by integrating output signals from the signal processing means;

input voltage means for generating and transmitting a variable input voltage according to the DC voltage generated by the DC voltage means; and anti-blooming bias means for receiving the variable input voltage and a reference voltage, for varying an anti-blooming bias according to a comparison of the variable input voltage with the reference voltage, and for transmitting the varied anti-blooming bias to the input terminal of the CCD image sensor, wherein the anti-blooming bias means automatically increases the anti-blooming bias by decreasing the difference between the input voltage and the reference voltage when excessive light is incident to the CCD image sensor, and automatically decreases the anti-blooming bias by increasing the difference between the input voltage and the reference voltage when insufficient light is incident to the CCD image sensor.

5. The auto variable anti-blooming bias circuit as claimed in claim 4, wherein the anti-blooming bias means includes differential amplification transistors each having a terminal to which are transmitted the variable input voltage from the input voltage means and the reference voltage, circuit driving transistors connected to the differential amplification transistors, and a transistor operated by differentially amplified signals applied to the differential amplification transistors.

6. The auto variable anti-blooming bias circuit as claimed in claim 4, wherein the input voltage means comprises a transistor having a terminal to which the output signal of the DC voltage means is applied and resistance means connected to the transistor for dividing a source voltage to transmit the variable input voltage to the anti-blooming bias means.

7. The auto variable anti-blooming bias circuit as claimed in claim 4, wherein the reference voltage is user adjustable.

8. The auto variable anti-blooming bias circuit as claimed in claim 4, wherein the DC voltage means includes integrator means for obtaining an average value of the output signals from the signal processing means and for transmitting the DC voltage to the input voltage means.

9. The auto variable anti-blooming bias circuit as claimed in claim 8, wherein the integrator means includes first and second integrators each including a resistor and a capacitor.

10. A charge coupled device (CCD) image sensor system, comprising:

a CCD image sensor including:
an n-type substrate,
a p-type substrate well having an overflow drain (OFD) region on the n-type substrate,
a photodiode provided over the OFD region,
a vertical charged coupled device (VCCD) region supported by the substrate and spaced from the photodiode, the OFD region defining a barrier layer which guides excess electrical charges generated in the photodiode to the substrate and away from the VCCD region, thereby reducing blooming and smear phenomena of the CCD image sensor system; and an automatic variable anti-blooming bias system including feedback circuit means for detecting a quantity of electrical charges output from the photodiode, and then providing an output voltage to the substrate according to the detected quantity, such that if excessive light is received by the photodiode the output voltage is automatically increased by decreasing a difference between an input voltage and a reference voltage and if insufficient light is received by the photodiode the output voltage is automatically decreased by increasing the difference between the input voltage and the reference voltage.

11. The CCD image sensor system as claimed in claim 10, wherein the feedback circuit means includes:

signal processing means for processing detected image output signals from an output terminal of the CCD image sensor;

DC voltage means for generating a DC voltage by integrating output signals of from the signal processing means;

input voltage means for generating a variable input voltage according to the DC voltage generated by the DC voltage means; and anti-blooming bias means for receiving the variable input voltage and a reference voltage, for varying an anti-blooming bias according to a comparison of the variable input voltage and the reference voltage, and for transmitting the anti-blooming bias to the input terminal of the CCD image sensor.

12. The CCD image sensor system as claimed in claim 11, wherein the input voltage means comprises a transistor having a base terminal to which the DC voltage is applied and resistance means connected to the transistor for dividing a source voltage to transmit the variable input voltage to the anti-blooming bias means.

13. The CCD image sensor system as claimed in claim 11, wherein the anti-blooming bias means includes differential amplification transistors each having a base terminal to which is transmitted the variable input voltage and the reference voltage, current driving transistors connected to the differential amplification transistors, and a transistor operated by differentially amplified signals applied to the differential amplification transistors.

14. The CCD image sensor system as claimed in claim 11, wherein the reference voltage is user adjustable.

15. The CCD image sensor system as claimed in claim 11, wherein the DC voltage means includes integrator means for obtaining an average value of the output signals from the signal processing means and for transmitting the DC voltage to the input voltage means.

16. The CCD image sensor system as claimed in claim 15, wherein said integrator means includes first and second integrators each including a resistor and a capacitor.

17. An auto-variable anti-blooming bias circuit for generating an anti-blooming bias for a charge coupled device (CCD) sensor having a semiconductor substrate, comprising:

DC voltage generating means for generating a DC voltage by integrating output signals from the CCD sensor;

input voltage generating means for generating a variable input voltage according to the DC voltage; and anti-blooming bias generating means for generating the anti-blooming bias according to a difference between the variable input voltage and a reference voltage, wherein the anti-blooming bias generating means automatically increases the anti-blooming bias by decreasing the difference between the variable input voltage and the reference voltage when excessive light is incident to the CCD image sensor, and automatically decreases the anti-blooming bias by increasing the difference between the variable input voltage and the reference voltage when insufficient light is incident to the CCD image sensor.

18. The circuit of claim 17, wherein the DC voltage generating means includes first and second low pass filters.

19. The circuit of claim 17, wherein the input voltage generating means includes a transistor having a base terminal for receiving the DC voltage, a collector terminal coupled to a source voltage through a first resistor, and an emitter terminal coupled to ground through a second resistor.

20. The circuit of claim 18, wherein the anti-blooming bias generating means includes:

a first differential amplification transistor having a base terminal for receiving the variable input voltage;

a second differential amplification transistor having a base terminal for receiving the reference voltage;

a first current driving transistor having a collector terminal coupled to a collector terminal of the second differential amplification transistor and a base terminal coupled to a collector terminal of the first differential amplification transistor;

a second current driving transistor having a collector terminal coupled to a collector terminal of the first differential amplification transistor and a base terminal coupled to the collector terminal of the first differential amplification transistor;

a current source coupled to an emitter terminal of the first differential amplification transistor and an emitter terminal of the second differential amplification transistor; and a transistor having a base terminal coupled to the collector terminal of the second differential amplification transistor and the emitter terminal of the second current driving transistor, a collector terminal coupled to the source voltage, and an emitter terminal coupled to ground.

21. A charge coupled device (CCD) sensor system, comprising:

a CCD sensor having a substrate; and an auto-variable anti-blooming bias circuit for generating an anti-blooming bias for the CCD sensor to adjust an electrical potential barrier toward the substrate so that a quantity of saturated signal charges is controlled, wherein the auto-variable anti-blooming bias circuit automatically reduces the anti-blooming bias by increasing a difference between a variable input voltage and a reference voltage to lower an electrical potential barrier toward substrate so that the quantity of the saturated signal charges is increased if insufficient light is received by the CCD sensor, and wherein the anti-blooming bias circuit automatically increases the anti-blooming bias by decreasing the difference between the variable input voltage and the reference voltage if excessive light is received by the CCD sensor.

22. The CCD sensor system of claim 21, wherein the auto-variable anti-blooming bias circuit includes:

DC voltage generating means for generating a DC voltage by integrating output signals from the CCD sensor;

input voltage generating means for generating a variable input voltage according to the DC voltage; and anti-blooming bias generating means for generating the anti-blooming bias according to a difference between the variable input voltage and a reference voltage, wherein the auto-variable anti-blooming bias means automatically increases the anti-blooming bias when the variable input voltage is greater than the reference voltage and automatically decreases the anti-blooming bias when the variable input voltage is less than the reference voltage.

23. The CCD sensor system of claim 22, wherein the DC voltage generating means includes first and second low pass filters.

24. The CCD sensor system of claim 22, wherein the input voltage generating means includes a transistor having a base terminal for receiving the DC voltage, a collector terminal coupled to a source voltage through a first resistor, and an emitter terminal coupled to ground through a second resistor.

25. The CCD sensor system of claim 22, wherein the anti-blooming bias generating means includes:

a first differential amplification transistor having a base terminal for receiving the variable input voltage;

a second differential amplification transistor having a base terminal for receiving the reference voltage;

a first current driving transistor having a collector terminal coupled to a collector terminal of the second differential amplification transistor and a base terminal coupled to a collector terminal of the first differential amplification transistor;

a second current driving transistor having a collector terminal coupled to a collector terminal of the first differential amplication transistor and a base terminal coupled to a collector terminal of the first differential amplification transistor;

a current source coupled to an emitter terminal of the first differential amplification transistor and an emitter terminal of the second differential amplification transistor; and a transistor having a base terminal coupled to the collector terminal of the second differential amplification transistor and the emitter terminal of the second current driving transistor, a collector terminal coupled to the source voltage, and an emitter terminal coupled to ground.

26. A method for generating an anti-blooming bias for a charge coupled device (CCD) sensor, comprising the steps of:

receiving an output signal from the CCD sensor; and generating an anti-blooming bias for the CCD sensor such that if the output signal indicates that excessive light is received by the CCD sensor the anti-blooming bias is automatically increased by decreasing a difference between a variable input voltage and a reference voltage to raise an electrical potential barrier toward the substrate so that a quantity of saturated signal charges is decreased, and if the output signal indicates that insufficient light is received by the CCD sensor the anti-blooming bias is automatically reduced by increasing the difference between the variable input voltage and the reference voltage to lower an electrical potential barrier so that the quantity of the saturated signal charges is increased.

27. The method of claim 26, wherein the step of generating the anti-blooming bias includes the steps of:

generating a DC voltage by integrating the output signal from the CCD sensor;

generating a variable input voltage according to the DC voltage; and generating the anti-blooming bias according to a difference between the variable input voltage and a reference voltage, wherein the anti-blooming bias is automatically increased when the variable input voltage is greater than the reference voltage and is automatically decreased when the variable input voltage is less than the reference voltage.

28. The method of claim 27, wherein the step of integrating the output signal from the CCD sensor includes the step of low pass filtering the output signal.

* * * * *